United States Patent
Corghi

(10) Patent No.: US 10,989,625 B2
(45) Date of Patent: Apr. 27, 2021

(54) VEHICLE HEADLIGHT MEASUREMENT SYSTEM INSTRUMENTATION STRUCTURE

(71) Applicant: NEXION S.P.A., Correggio (IT)

(72) Inventor: Giulio Corghi, Correggio (IT)

(73) Assignee: NEXION S.P.A., Correggio (IT)

(*) Notice: Subject to any disclaimer, the term of this patent is extended or adjusted under 35 U.S.C. 154(b) by 0 days.

(21) Appl. No.: 16/683,345

(22) Filed: Nov. 14, 2019

(65) Prior Publication Data
US 2020/0158598 A1 May 21, 2020

(30) Foreign Application Priority Data
Nov. 15, 2018 (IT) .................. 102018000010372

(51) Int. Cl.
*G01M 11/06* (2006.01)
*H04W 4/40* (2018.01)

(52) U.S. Cl.
CPC ........ *G01M 11/064* (2013.01); *G01M 11/061* (2013.01); *G01M 11/067* (2013.01); *H04W 4/40* (2018.02)

(58) Field of Classification Search
CPC ...... H04W 4/40; G01M 11/06; G01M 11/061; G01M 11/062; G01M 11/064; G01M 11/065; G01M 11/067; G01M 11/068; G01B 11/27; G01B 11/272; G01B 11/275; G01B 11/2755
USPC ................... 356/121, 122, 139.09
See application file for complete search history.

(56) References Cited

U.S. PATENT DOCUMENTS

| | | | | |
|---|---|---|---|---|
| 4,634,275 A | * | 1/1987 | Yoshida | G01M 11/065 348/95 |
| 5,170,220 A | * | 12/1992 | Matsumoto | G01M 11/064 356/121 |
| 5,213,439 A | * | 5/1993 | De Keyzer | E01F 9/506 404/12 |
| 5,379,104 A | * | 1/1995 | Takao | G01M 11/064 356/121 |
| 6,363,619 B1 | * | 4/2002 | Schirmer | G01S 7/4026 33/288 |
| 8,274,648 B2 | * | 9/2012 | Corghi | G01B 11/2755 356/139.09 |
| 8,538,724 B2 | * | 9/2013 | Corghi | G01B 11/2755 702/150 |

(Continued)

FOREIGN PATENT DOCUMENTS

WO 2016110627 A1 7/2016
WO 2018167809 A1 9/2018

*Primary Examiner* — Gordon J Stock, Jr.
(74) *Attorney, Agent, or Firm* — Pearne & Gordon LLP

(57) ABSTRACT

A vehicle (9) headlight measurement system instrumentation structure (1) comprises: a support structure (3); a vehicle calibration assistance structure (4), which is carried by the support structure (3) and includes a headlight aiming device (40), configured to facilitate alignment or calibration of a headlight (90) of the vehicle (9), the vehicle (9) being positioned within a service area (8); a processing system (11) configured to receive, from the headlight aiming device (40), data correlated with a light beam emitted by the headlight (90) and to provide, through an interface (10), an informative indication relating to an operating condition of the headlight (90), where the processing system (11) includes a communication port (12) connectable to an electronic control unit (91) of the vehicle (9).

17 Claims, 3 Drawing Sheets

(56) References Cited

U.S. PATENT DOCUMENTS

| | | | |
|---|---|---|---|
| 9,354,139 B2* | 5/2016 | Ekladyous | G01M 11/061 |
| 9,644,782 B2* | 5/2017 | Linson | F16M 11/046 |
| 10,408,706 B2* | 9/2019 | Larsen | G01M 11/065 |
| 10,634,488 B2* | 4/2020 | Stieff | G01S 7/4972 |
| 2004/0172170 A1* | 9/2004 | Lesert | G01B 11/2755 |
| | | | 700/279 |
| 2015/0049188 A1* | 2/2015 | Harrell | H04N 17/002 |
| | | | 348/139 |
| 2020/0074767 A1* | 3/2020 | Cavalli | G07C 5/08 |
| 2020/0103308 A1* | 4/2020 | Corghi | G01M 11/067 |
| 2020/0105018 A1* | 4/2020 | Corghi | G01B 11/2755 |

* cited by examiner

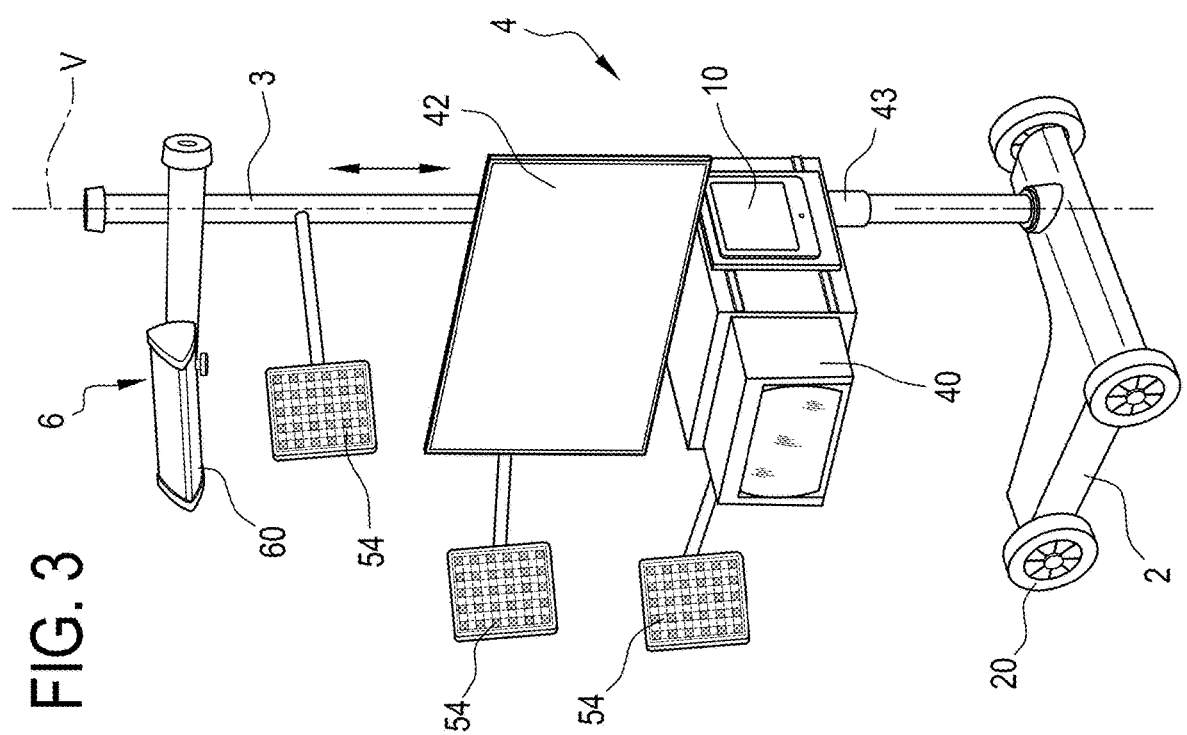
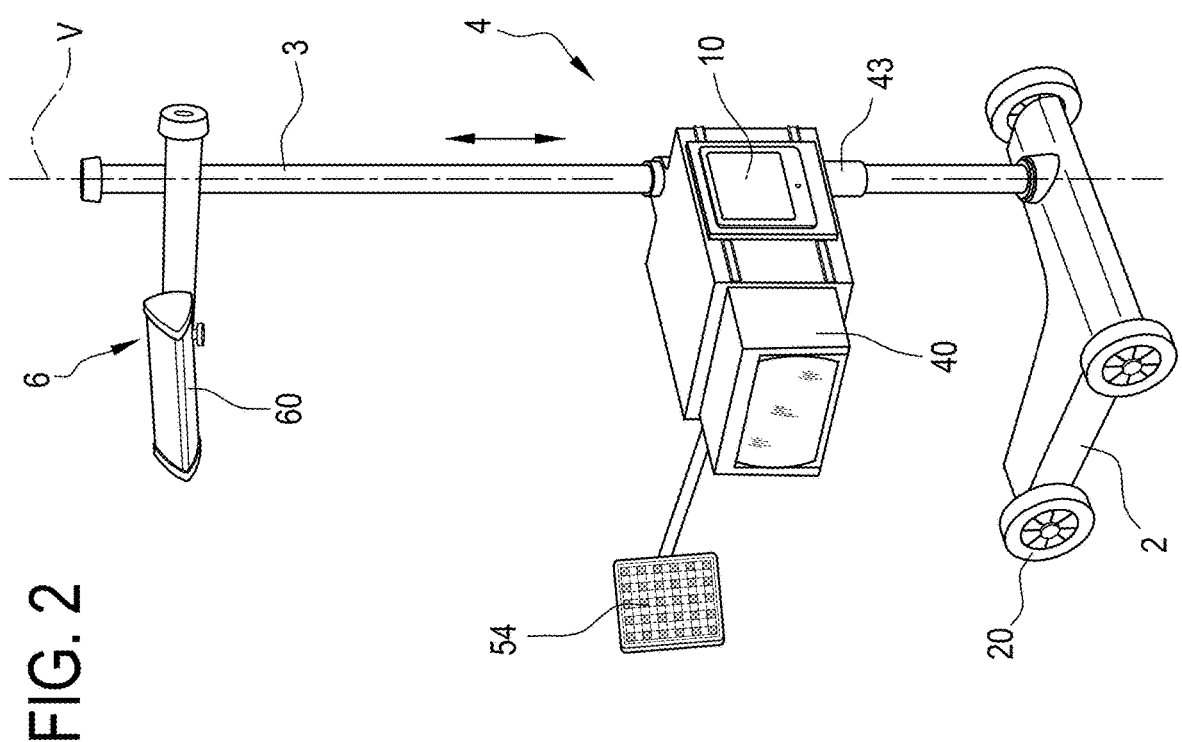

VEHICLE HEADLIGHT MEASUREMENT SYSTEM INSTRUMENTATION STRUCTURE

This invention relates to a vehicle headlight measurement system instrumentation structure (hereinafter also referred to simply as vehicle headlight testing instrument system) and to a method for checking a vehicle headlight.

In this field, it is common practice to calibrate and align vehicle headlights using structures positioned in front of the vehicle. For example, patent document U.S. Pat. No. 6,363,619B1 describes a vehicle headlight testing instrument system which allows adjusting the orientation or alignment of the headlights of a vehicle. Other examples of vehicle headlight testing instrument systems are provided in patent documents WO2018/167809 and WO2016/110627A1.

Prior art headlight testing instrument systems have several disadvantages: for example, they provide an indication as to how the orientation of the headlight should be corrected but this must then be done manually by a user to obtain an optimum orientation; positioning is also highly time-consuming and not very precise (resulting in imprecise headlight alignment).

It should also be noted that the headlights of vehicles of the latest generation have electronically controlled functions: that is to say, they are, so to speak, smart headlights. Moreover, vehicles nowadays are equipped with a number of advanced driver assistance systems—known as ADAS for short—which are (also) electronically controlled.

In light of this, the need has arisen to simplify systems for total calibration of headlights (or other electronically controlled components such as ADAS systems).

This disclosure has for an aim to provide a vehicle headlight measurement system instrumentation structure (or vehicle headlight testing instrument system) and a method for checking a headlight aiming device mounted on a headlight testing instrument system to overcome the above mentioned drawbacks of the prior art.

This aim is fully achieved by the vehicle headlight testing instrument system and the method for checking a vehicle headlight of this disclosure, as characterized in the appended claims.

More generally speaking, this disclosure tackles the problem of how to provide a system and a method for conveniently (easily) and totally calibrating the headlights or other electronically controlled components, such as ADAS systems.

According to one aspect it, this disclosure relates to a vehicle headlight measurement system instrumentation structure (that is a vehicle headlight testing instrument system).

In an embodiment, the headlight testing instrument system includes a base unit. In an embodiment, the headlight testing instrument system comprises a support structure. The support structure is connected to the base unit.

In an embodiment, the headlight testing instrument system comprises a vehicle calibration assistance structure. The vehicle calibration assistance structure is mounted on (that is, connected to) the support structure.

According to one aspect of it, this disclosure relates to a system for adjusting a vehicle sensor. In an embodiment, the support structure thus forms part of the system for adjusting a vehicle sensor. What is described hereinafter in connection with the headlight testing instrument system also applies, with the necessary changes made, to the case where the system is a system for adjusting a vehicle sensor (whether stand-alone or integrated in the testing instrument system).

In an embodiment, the vehicle calibration assistance structure includes a headlight aiming device. The headlight aiming device is configured to facilitate alignment or calibration of a vehicle headlight. Preferably, the vehicle is positioned in a service area (during a headlight alignment or calibration procedure). In an embodiment, the headlight aiming device is positioned forward of the vehicle (that is, in front of the vehicle in the vehicle's forward travel direction) which is positioned in the service area. Preferably, the support structure is adjacent to the service area.

The headlight aiming device is configured to capture data correlated with a light beam emitted by the headlight.

In an embodiment, the headlight testing instrument system comprises a processing system. The processing system is configured to receive from the headlight aiming device the data correlated with the light beam emitted by the headlight. The processing system is configured to process these data.

The headlight testing instrument system includes an operator interface. In an embodiment, the operator interface includes an input device. In an embodiment, the operator interface includes an output device. In an embodiment, the input device is a keyboard. In an embodiment, the output device is a screen. In an embodiment, the screen is a touch screen and can therefore be used both as an input device and an output device.

The headlight testing instrument system comprises a single operator interface through which the operator can communicate with the headlight aiming device, with a positioning device, if any, and with vehicle safety calibration devices, if any.

The processing system is configured to provide, through the interface (specifically through the interface output device) an informative indication relating to an operating condition of the headlight.

The headlight testing instrument system preferably includes a communication port which is connectable to an electronic control unit of the vehicle.

In an embodiment, the processing system is configured to retrieve input data from the vehicle's electronic control unit. The input data include information relating to faults or informative indications regarding the state of the vehicle. Thus information relates to faults or informative indications detected by the selfsame control unit of the vehicle and/or stored therein. The information relating to faults may include information relating to faults which have occurred in the headlight, sensors, cameras or other vehicle parts. The information relating to informative indications may include information indicating an ON or OFF state of the vehicle headlight.

In an embodiment, the input data include values measured by one or more of the vehicle sensors.

In an embodiment, the processing system is configured to process the input data. In an embodiment, the processing system is configured to generate drive signals. The drive signals are generated as a function of the input data.

In an embodiment, the processing system is configured to send the drive signals to the electronic control unit of the vehicle. The drive signals are used to control the vehicle headlight through the electronic control unit.

In an embodiment, the drive signals include a command to switch on the headlight or part of it. For example, the headlight may include an array of LEDs and the drive signals may be used to switch on one or more LEDs of that array of LEDs.

In an embodiment, the drive signals include a command to make the headlight or part of it perform a reference movement. The reference movement command is an instruction telling the electronic control unit to vary the orientation of the headlight according to a predetermined path in order to check the headlight or the part of it for correct operation (in particular for correct orientation). For example, the reference movement may indicate whether a repair job has been successful and/or it may be used to diagnose a problem in the headlight.

In an embodiment, the information relating to the faults includes a plurality of fault codes. The fault codes may, for example, be alphanumeric codes. In an embodiment, the processing system may include a matching logic for associating each fault code of the plurality of fault codes with a corresponding fault item. In an embodiment, the matching logic includes a table in which one fault code of the plurality of fault codes is associated with one or more corresponding fault items.

The matching logic is thus contained in the processing system. The fault logic may also be integrated, updated or modified by an operator (through the interface) based on their experience in the field.

The processing system may be programmed to automatically upgrade the matching logic, responsive to the information relating to the faults (and, in addition or in alternative, responsive to information input by a user to the processing system through a user interface), through an artificial intelligence tool (e.g. a neural network or any other machine learning architecture), the processing system being provided with said artificial intelligence tool.

In an embodiment, the processing system is configured to generate a report document. The report document is preferably generated at the end of a procedure for aligning, calibrating or checking the headlights. In an embodiment, the report document contains one or more of the input data items. In an embodiment, the report document contains the data correlated with the light beam emitted by the headlight and captured by the headlight aiming device. In an embodiment, the report document contains the informative indications provided by the processing system and relating to an operating condition of the headlight. In an embodiment, the report document contains the drive signals sent to the control unit. In an embodiment, the report document contains vehicle identification data (for example, registration number, make model, chassis number, etc.).

In an embodiment, the headlight testing instrument system includes a printer. The printer may be a 2D inkjet printer; the printer may be a PDF printer; the printer may be a bar code printer; the printer may be a QR code printer.

In an embodiment, the bar code or the QR code may contain data relating to the test or the data of the link where the results of the test can be found. In an embodiment, the processing system is configured to send the report document to the printer.

In an embodiment, the processing system is configured to send the report document to an external network (for example, to a cloud).

In an embodiment, the communication port includes a wireless device connectable to the vehicle's control unit. For example, the communication port may include a Bluetooth device and/or a Wi-Fi device.

In an embodiment, the communication port includes a Vehicle Communication Interface (VCI) key which is connectable to the vehicle's control unit.

In an embodiment, the vehicle's control unit includes a memory unit. In an embodiment, the memory unit is local. In an embodiment, the memory unit is remote.

The memory unit is connected to the processing system to store the information relating to the faults or informative indications regarding the state of the vehicle. In an embodiment, the drive signals include one or more delete commands to delete from the memory unit one or more of the information items relating to the faults or informative indications regarding the state of the vehicle. In an embodiment, for each type of fault or informative indication, the drive signals comprise a respective delete command (configured to delete the respective fault or informative indication from the memory unit). In an embodiment, the drive signals include a delete all command to delete from the memory unit all the information items relating to the faults or informative indications regarding the state of the vehicle.

In an embodiment, the processing system has access to a database, which may be local (in a memory within the processing system of the headlight measurement system instrumentation structure) or remote (e.g. located at a remote server, accessible through a communication network). This database contains, for each vehicle model (typology), key information, which enable the processing system to access the control unit of the vehicle (or to access one or more of the control unit of the vehicle, if the vehicle comprises a plurality of control units); e.g. such key information may include passwords or other access codes provided by the vehicle manufacturer; also, the key information may be descriptive of a layout of the control unit of the vehicle (since the control unit may include a plurality of units, i.e. a plurality of control (sub-)units); such a layout may include, for example, a list of the control units provided in the vehicle.

The key information may also enable the processing system to write data into the memory unit of the control unit of the vehicle; in this regard, the processing system may be programmed to record into the memory unit maintenance information, which is descriptive of the changes (or cancellations) applied to the memory unit. In a possible example, the maintenance information and include the date on which said changes occurred (that is, the date of the maintenance).

In an embodiment, the vehicle calibration assistance structure includes at least one safety calibration device, configured to facilitate alignment or calibration of a respective component of a safety system of the vehicle.

In an embodiment, the safety calibration device includes a reflector configured to reflect electromagnetic waves to facilitate alignment or calibration of a radar sensor of the vehicle's safety system. In an embodiment, the safety calibration device includes a target panel having a surface which faces the vehicle service area and which bears an image providing a predetermined graphical feature visible to a camera to facilitate alignment or calibration of a camera of the vehicle.

In an embodiment, the processing system is configured to receive, from the safety calibration device, data which is correlated with a condition of the respective component of the vehicle's safety system (which may, for example, be a radar sensor or a camera). In an embodiment, the processing system is configured to provide, through the interface, an informative indication relating to an operating condition of the component of the vehicle's safety system. In an embodiment, the input data retrieved by the vehicle's control unit include informative indications regarding the state of the vehicle's safety components and/or the state of the vehicle's headlights. In an embodiment, the drive signals include one or more commands for activating one or more components of the vehicle's safety system (for example, radar or camera) to instruct the electronic control unit to activate them.

In an embodiment, the report document contains informative indications about the history of the maintenance operations applied to the vehicle, based on the information which can be retrieved from the vehicle control unit (e.g. based on the maintenance information memorized in the memory unit).

In an embodiment, the report document contains informative indications or information items regarding the state of the vehicle's safety components. In an embodiment, the drive signals include one or more delete commands to delete from the memory unit informative indications or information items regarding the state of the vehicle's safety components.

In an embodiment, the headlight testing instrument system comprises a positioning target element. The positioning target element includes a surface provided with a predetermined graphical feature. The positioning target element is supported by the support structure. In an embodiment, the positioning target element is connected to the support structure. In an embodiment, the positioning target element is connected to the vehicle calibration assistance structure. In an embodiment, the positioning target element is connected to the headlight aiming device. The positioning target element is oriented in a forward (that is, frontal or anterior) direction towards the service area.

In an embodiment, the headlight testing instrument system comprises a positioning device. The positioning device is configured to aid with the relative positioning between the vehicle and the vehicle calibration assistance structure. In an embodiment, the positioning device is located in the service area. In an embodiment, the positioning device is located beside the vehicle.

In an embodiment, the positioning device is movable on wheels. In an embodiment, the positioning device is movable on guides. In an embodiment, the guides (preferably two) are elongate in a direction parallel to the vehicle. In an embodiment, the positioning device is movable between four operating positions, where it respectively "sees" each of the four vehicle wheels.

In an embodiment, the positioning device is spaced from the support structure. In an embodiment, the positioning device includes an optical device, oriented in lateral direction to see graphical features of the vehicle. Preferably, the lateral direction is defined by the positioning device towards the vehicle (preferably, towards an axle or a wheel of the vehicle). In an embodiment, the positioning device includes a matching camera oriented in a backward direction to see the positioning target element.

By "forward direction" is meant the direction from the support structure to the service area. By "backward direction" is meant, vice versa, the direction from the service area to the support structure (opposite to the "forward" direction).

The processing system is operatively connected to the positioning device to receive data therefrom. In an embodiment, the data that the positioning device sends to the processing system are image data, captured by the matching camera and the optical device.

The processing system includes a processor. The processor is programmed with instructions for processing the data received from the positioning device. The processor is programmed to determine measurements. In an embodiment, the measurements include at least one spatial correlation between the vehicle calibration assistance structure and the vehicle. In an embodiment, the processor is configured to determine measurements that include a position of the support structure relative to a thrust axis of the vehicle. In an embodiment, the processor is configured to determine measurements that include a position of the support structure relative to a centre line of the vehicle.

In an embodiment, the measurements include at least one spatial correlation between the headlight aiming device and the vehicle. In an embodiment, the measurements include at least one spatial correlation between the support structure and the vehicle.

The use of a positioning device which includes an optical device and a matching camera and which is connected to the processing system to correctly position the vehicle calibration assistance structure (hence the headlight aiming device) relative to the vehicle, allows positioning to be carried out quickly and precisely.

In an embodiment, the optical device includes a first camera. In an embodiment, the optical device includes a second camera. The first camera and the second camera are connected in a stereo configuration. In an embodiment, the processing system is configured to derive a 3D representation of a vehicle portion viewed by the first and the second camera.

In an embodiment, the positioning device includes a frame. In an embodiment, the optical device and the matching camera are attached to the frame.

In an embodiment, the positioning device includes an electronic board configured to transmit data to the processing system. In an embodiment, the electronic board of the positioning device is attached to the frame. In an embodiment, the electronic board of the positioning device is remote.

In an embodiment, the electronic board of the positioning device is connected to the first and the second camera. In an embodiment, the electronic board is connected to the matching camera. The electronic board of the positioning device is configured to transmit data (in an embodiment, image data) to the processing system.

In an embodiment, the vehicle calibration assistance structure includes a carriage. The carriage is movably connected to the support structure. In an embodiment, the carriage is slidable along the support structure in a vertical direction (parallel to the weight force). In an embodiment, the carriage comprises a blocking member configured to block it at a certain height along the support structure. In an embodiment, the carriage can be positioned at a plurality of positions on the support structure. In an embodiment, the headlight aiming device is mounted on the carriage (in an embodiment, removably). In an embodiment, the positioning target element is attached to the carriage. That way, the processing system can determine a spatial correlation between the carriage (hence the headlight aiming device mounted on the carriage) and the vehicle as a function of the data received from the positioning device.

In an embodiment, the vehicle calibration assistance structure includes an optical projection system. In an embodiment, the optical projection system includes (at least) a laser emitter. In an embodiment, the laser emitter can pivot, that is, oscillate, about its axis.

In an embodiment, the processing system is operatively coupled to the optical projection system to activate the laser emitter to project a ray onto a surface in proximity to the vehicle headlight testing instrument system. In an embodiment, the processing system is connected to the optical projection system to determine a distance between the laser projector and the surface on which the laser ray is projected (which may be a surface of the vehicle). The optical projection system is useful, in particular, for prepositioning the calibration assistance structure at a predetermined, factory-set distance from the vehicle.

In an embodiment, the headlight aiming device includes an optic housing having one or more Fresnel lenses. The light from the headlight passes through one or more Fresnel lenses and is concentrated on a surface of the optic housing in order to test the headlights.

In an embodiment, the vehicle calibration assistance structure comprises a safety calibration device. The safety calibration device is configured to facilitate alignment or calibration of a component (or two or more components) of a safety system of the vehicle. In an embodiment, the component of the safety system of the vehicle forms part of an advanced driver-assistance system (ADAS): for example, it may be a camera, a laser sensor or a radar sensor.

In an embodiment, the vehicle calibration assistance structure comprises the safety calibration device and not the headlight aiming device. In this case, the system of this disclosure is a system for adjusting a vehicle sensor.

In an embodiment, the vehicle calibration assistance structure comprises both the safety calibration device and the headlight aiming device.

In an embodiment, the safety calibration device includes a reflector. In an embodiment, the reflector is configured to reflect electromagnetic waves. The reflector is configured to facilitate alignment or calibration of a radar sensor of the vehicle safety system.

In an embodiment, the safety calibration device includes a target panel. The target panel has a surface which faces the service area. The surface of the target panel bears an image providing a predetermined graphical feature, visible to a camera (or by a LIDAR sensor) of the vehicle. The graphical feature is configured to facilitate alignment or calibration of the camera (or LIDAR sensor) of the vehicle. In an embodiment, an operator selects a target panel bearing an image with a graphical feature determined as a function of the type of vehicle (make/model). In an embodiment, the surface of the target panel is reflective. In an embodiment, the surface of the target panel has high contrast.

In an embodiment, the target panel is configured to show an image used to calibrate infrared sensors (cameras) for night vision; in this case, the surface of the target panel has a contrast which is suitable for showing the image.

This disclosure also relates to a method. According to an aspect of this disclosure, the method is a method for checking a headlight of a vehicle.

According to an aspect of this disclosure, the method is a method for checking a component of a safety system of the vehicle (for example, a radar or a camera).

According to an aspect of this disclosure, the method is a method for aligning a headlight aiming device mounted on a headlight testing instrument system of a vehicle.

According to an aspect of this disclosure, the method is a method for aligning a vehicle calibration assistance structure relative to a vehicle.

The vehicle is positioned in a service area. The method is preferably used during a calibration or measurement procedure associated with the vehicle.

In an embodiment, the method comprises a step of providing support structure which supports a vehicle calibration assistance structure. In an embodiment, the headlight aiming device comprises a vehicle calibration assistance structure.

In an embodiment, the method comprises a step of capturing data correlated with a light beam emitted by the vehicle headlight, where the step of capturing is performed by a headlight aiming device.

In an embodiment, the method comprises a step of processing the data correlated with the light beam emitted by the vehicle headlight, where the step of processing is performed in a processing system.

In an embodiment, the method comprises a step of sending to an interface an informative indication relating to an operating condition of the headlight. In an embodiment, the method comprises a step of connecting the processing system to an electronic control unit of the vehicle through a communication port of the processing system.

In an embodiment, the method comprises a step of the processing system receiving from the vehicle's electronic control unit input data which include information relating to faults or informative indications regarding the state of the vehicle.

In an embodiment, the method comprises a step of processing the input data. The input data are processed in the processing system. In an embodiment, the method comprises a step of generating drive signals. The drive signals are generated by the processing system in response to the input data received from the control unit.

In an embodiment, the method comprises a step of sending the drive signals to the vehicle's electronic control unit through the processing system to control the headlight of the vehicle through the electronic control unit of the vehicle.

In an embodiment, the drive signals include a command to switch on the headlight or part of it, thereby instructing the electronic control unit to switch on the headlight or the part of it.

In an embodiment, the method comprises a step of checking that the headlight or part of it switches on when the command to switch it on is sent to the control unit. The check is carried out by the processing system through the headlight aiming device.

In an embodiment, the drive signals include a command to make the headlight or part of it perform a reference movement by instructing the electronic control unit to vary the orientation of the headlight according to a predetermined path. In one embodiment, the method comprises a step of checking that the headlight or the part of it is working correctly. The check is carried out by the processing system through the headlight aiming device.

In an embodiment, the method comprises a step of associating fault codes (indicating the information relating to the faults) with respective fault items through a matching logic contained in the processing system.

In an embodiment, the method comprises a step of generating a report document. The report document contains one or more of the following data items: the identification data of the vehicle; the identification data of the vehicle owner; the input data; the drive signals, the informative indications relating to an operating condition of the headlight as captured by the headlight aiming device; the informative indications relating to an operating condition of the component of the vehicle safety system (for example, a camera or a radar sensor); the repairs carried out; the set adjustment parameters of the headlights (for example, intensity and orientation).

In an embodiment, the method comprises a step of sending the report document to a printer. In an embodiment, the method comprises a step of sending the report document to an external network.

In an embodiment, the method comprises a step of storing the information items relating to the faults or informative indications regarding the state of the vehicle in a memory unit connected to the processing system (local or remote). The drive signals include one or more delete commands. In an embodiment, the method comprises a step of deleting from the memory unit one or more of the information items relating to the faults or informative indications regarding the state of the vehicle, this step being carried out by sending the one or more delete commands.

In an embodiment, the method comprises a step of providing a positioning device.

In an embodiment, the method comprises a step of viewing graphical features of the vehicle through an optical device. The optical device is included in the positioning device. In an embodiment, the positioning device is spaced from the support structure.

In an embodiment, the method comprises a step of providing a positioning target element which includes a surface that bears a predetermined graphical feature. The positioning target element is supported by (in an embodiment, connected to) the support structure.

In an embodiment, the method comprises a step of viewing the positioning target element with a matching camera included in the positioning device.

In an embodiment, the method comprises a step of processing data from the optical device and from the matching camera, using a processing system to determine measurements associated with the vehicle. In an embodiment, the measurements include at least one spatial correlation between the vehicle calibration assistance structure (or the headlight aiming device) and the vehicle.

In an embodiment, during the measurement or calibration procedure, the optical device is oriented in a lateral direction to view graphical features of the vehicle and the matching camera is oriented in a backward direction towards the support structure, to view the positioning target element. That way, the positioning device captures data representing the position of the vehicle and of the positioning target element (hence their positions relative to each other).

In an embodiment, the step of viewing includes viewing a portion of a vehicle through a first and a second camera of the optical device, connected in a stereo configuration. In an embodiment, the step of processing includes deriving a 3D representation of the vehicle portion viewed by the first and the second camera.

In an embodiment, the method comprises a step of adjusting a position of the vehicle calibration assistance structure (or of the headlight aiming device) relative to the vehicle. The step of adjusting includes projecting a laser ray on the vehicle positioned in the service area through an optical projection system included in the vehicle calibration assistance structure. The step of adjusting comprises horizontal movements of the support structure and/or vertical translations of the vehicle calibration assistance structure (or of the headlight aiming device) along the support structure.

In an embodiment, a camera is provided which is configured to see both the headlight and the position where the laser ray strikes the vehicle in order to correctly position the optical projection system relative to the vehicle. This camera and the vehicle must be on horizontal surfaces. The position of the camera is checked using levels (both mechanical and electronic) and/or 3-axis accelerometers (for example, MEMS).

In an embodiment, the movements necessary for adjusting the relative position are performed in automated manner.

In an embodiment, the step of adjusting comprises translating the calibration assistance structure in a horizontal direction (for example, by moving the base unit on its wheels) and/or in a vertical direction (for example, by moving the carriage along the support structure).

In an embodiment, method comprises a step of calibrating or aligning a component of the vehicle safety system using a safety calibration device (included in the vehicle calibration assistance structure). The component of the vehicle safety system may be any ADAS component (for example, a camera, a laser sensor, a radar sensor).

In an embodiment, the step of calibrating or aligning a component of the safety system is alternative to the step of aligning the headlights. In respective embodiments, the step of calibrating or aligning a component of the safety system follows or precedes the step of aligning the headlights.

What is described (in connection with both the system and the method) with reference to the front of the vehicle also applies, with the necessary changes made, to the back and sides of the vehicle. In effect, the system can be configured to calibrate one or more of the following components: headlights, rear lights, front cameras, rear cameras, side cameras, front radar sensors, rear radar sensors, side radar sensors.

These and other features are more apparent from the following description of a preferred embodiment, illustrated by way of non-limiting example in the accompanying drawings, in which:

FIGS. 2 and 3 illustrate respective embodiments of a vehicle calibration assistance structure of the headlight testing instrument system of FIG. 1;

Figure 1:
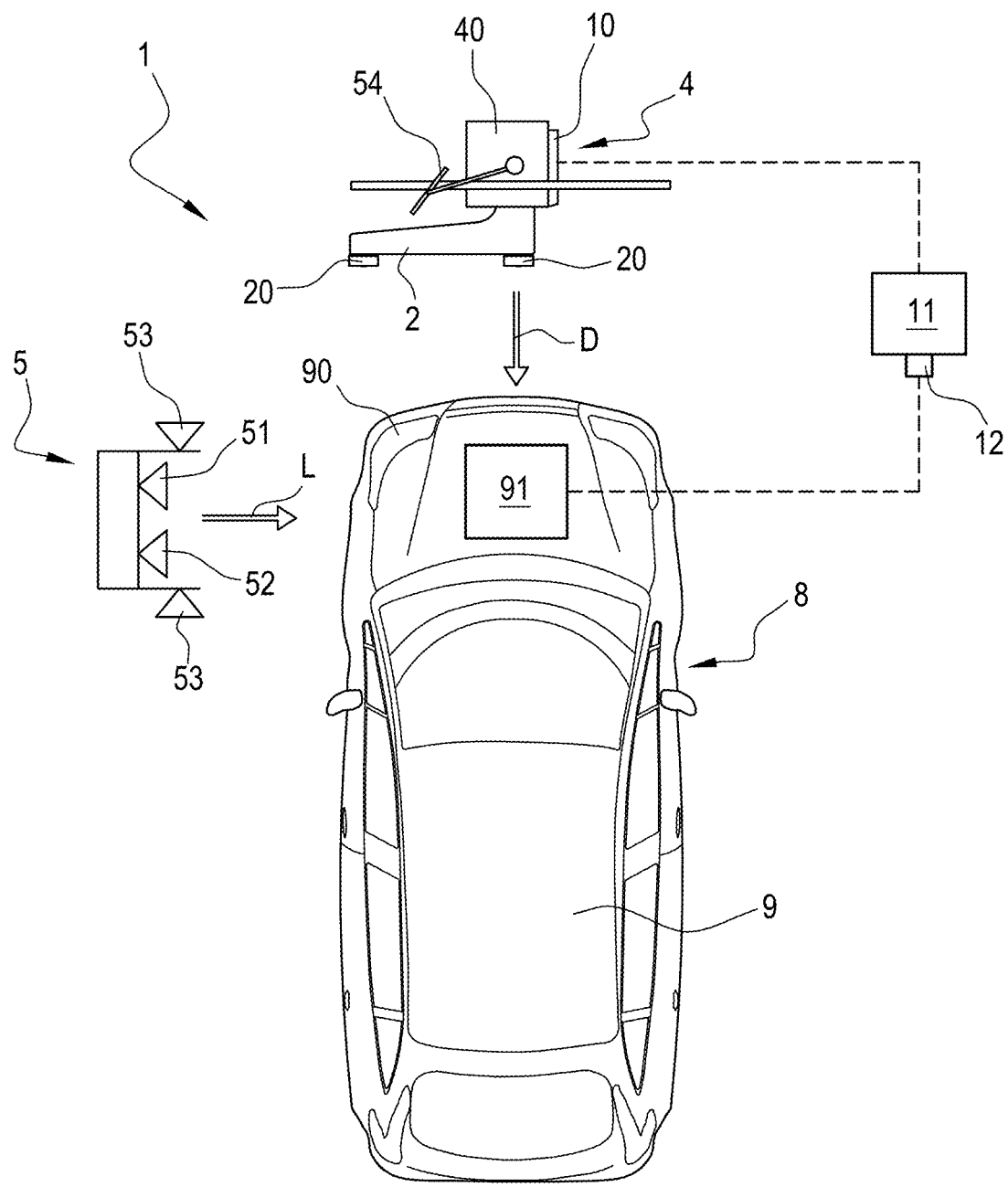
FIG. 1 illustrates a headlight testing instrument system according to this disclosure.
Figure 4:
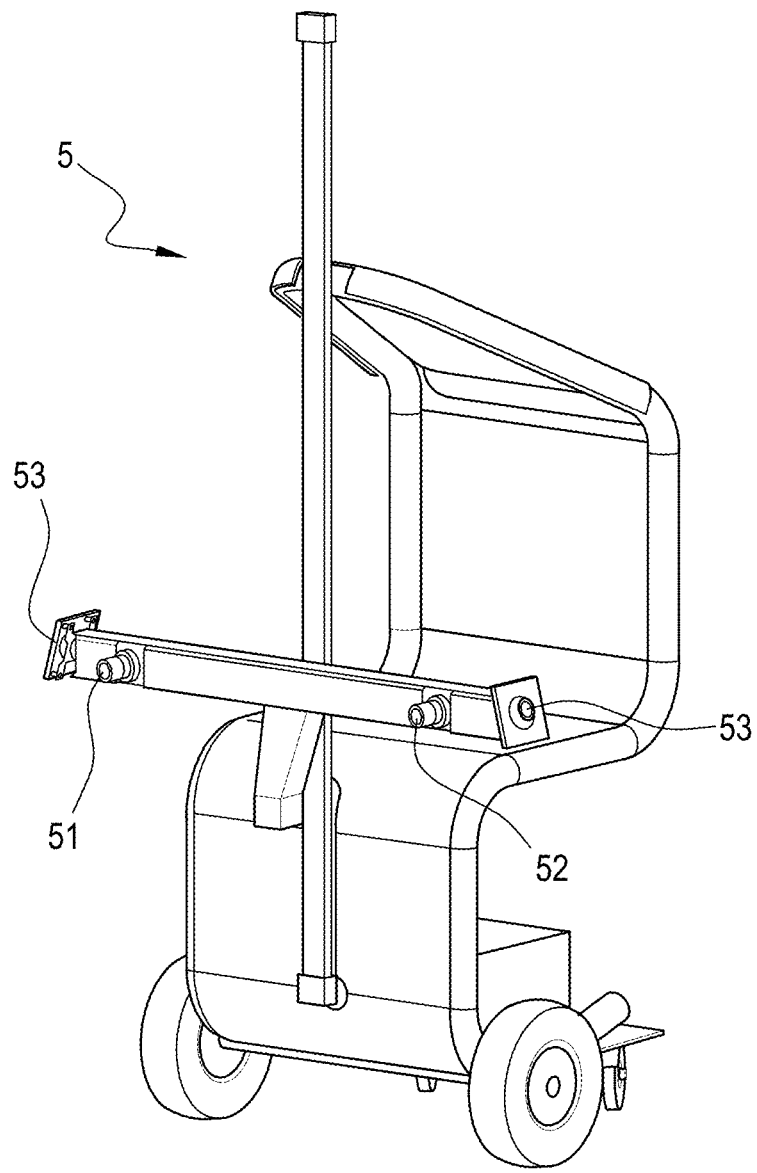
FIG. 4 illustrates a positioning device of the headlight testing instrument system of FIG. 1.

With reference to this disclosure, the numeral 1 denotes a headlight measurement system instrumentation structure (or headlight testing instrument system) for a vehicle 9.

The headlight testing instrument system 1 comprises a base unit 2. The base unit 2 comprises a plurality of wheels 20.

The system 1 comprises a support structure 3. The support structure 3 is connected to the base unit 2.

The system 1 comprises a vehicle calibration assistance structure 4. The vehicle calibration assistance structure 4 is mounted on the support structure 3.

In an embodiment, the vehicle calibration assistance structure 4 includes a headlight aiming device 40. The headlight aiming device 40 includes an optic housing having one or more Fresnel lenses.

In an embodiment, the vehicle calibration assistance structure 4 is removably attached to the support structure 3. In an embodiment, the vehicle calibration assistance structure 4 is slidable along the support structure 3 in a vertical direction V (parallel to the weight force).

In an embodiment, the vehicle calibration assistance structure 4 includes a headlight aiming device configured to facilitate alignment or calibration of a headlight 90 of the vehicle 9. During the procedure, the vehicle 9 is positioned in a service area 8 and the support structure 3 is placed in front of the service area 8. The vehicle 9 comprises an electronic control unit 91.

In an embodiment, the vehicle calibration assistance structure 4 includes a positioning target element 54. The positioning target element 54 includes a surface provided with a predetermined graphical feature. The positioning target element 54 is supported by the support structure 3. In an embodiment, the positioning target element 54 is connected to the headlight aiming device 40.

The positioning target element is oriented in a forward D towards the service area 8.

In an embodiment, the vehicle calibration assistance structure 4 includes a plurality of positioning target elements 54. For example, one positioning target element 54 might be connected to the support structure 3 and another positioning target element 54 might be connected to the headlight aiming device 40. In an embodiment, the mutual position between the positioning target element 54 and the headlight aiming device 40 is known beforehand.

In an embodiment, the system 1 comprises a positioning device 5.

The positioning device 5 is spaced from the support structure 3. The positioning device 5 is movable independently of the support structure 3.

The positioning device 5 includes an optical device, oriented in lateral direction L to see graphical features of the vehicle 9 (for example, to see a wheel or targets fixed to the vehicle 9). The optical device includes a first camera 51 and a second camera 52. Preferably, the first camera 51 and the second camera 52 are connected in a stereo configuration. The first camera 51 and the second camera 52 are connected to the frame 50.

The positioning device 5 includes a matching camera 53 oriented in a backward direction to see the positioning target element. The matching camera 53 is connected to the frame 50.

The headlight testing instrument system 1 includes a processing system 11.

The headlight testing instrument 1 system includes an operator interface 10. The operator interface 10 includes an input device and an output device. The operator interface may be on the support structure 3 or in proximity to the support structure 3 or on the positioning device 5.

The processing system 11 is configured to receive, from the headlight aiming device 40, data correlated with a light beam emitted by the headlight 90 and to provide, through the interface 10, an informative indication relating to an operating condition of the headlight 90.

The headlight testing instrument system 1 includes a communication port 12 which is connectable to the electronic control unit 91 of the vehicle 9.

The processing system 11 is configured to receive input data from the electronic control unit 91 through the communication port 12. The input data include information relating to faults or informative indications regarding the state of the vehicle 9.

The processing system 11 is configured to send drive signals to the electronic control unit 91 through the communication port 12 to control the headlight 90 through the electronic control unit 91.

The processing system includes a processor.

The processor may be positioned on the support structure 3 or in proximity to the support structure 3 or on the positioning device 5.

The first camera, 51, the second camera 52 and the matching camera 53 are operatively connected to the processing system. The processing system is configured with logical components and software instructions to receive image data from the first camera 51, from the second camera 52 and from the matching camera 53, to process the image data and to identify the relative spatial positions of the surfaces viewed, such as, for example, optical targets mounted on the wheels or on other surfaces of the vehicle 9 (viewed by the first camera 51 and by the second camera 52) and the surface of the positioning target element 54 (viewed by the matching camera 53) and to determine a spatial correlation between the vehicle 9 and the positioning target element 54 (hence the support structure 3 and/or the headlight aiming device 40).

In one embodiment, the positioning device 5 includes an operator interface connected to the processing system.

In other embodiments, the positioning device 5 may be structured differently; for example, it may comprise a pair of arms connected to a vertical post (in one embodiment, forming part of the same support structure 3), configured to position the first and second cameras at positions where they can view graphical features or targets associated with the vehicle 9.

In an embodiment, the vehicle calibration assistance structure 4 includes a carriage 43. The carriage 43 is movably connected to the support structure 3. The carriage 43 is slidable along the support structure 3 in the vertical direction V. The vehicle calibration assistance structure 4 is vertically movable along a portion of said support structure 3 by means of the carriage 43.

The headlight aiming device 40 is mounted on the carriage 43. In an embodiment, the headlight aiming device 40 is removably mounted on the carriage 43. In an embodiment, the positioning target element 54 (or a target of the plurality of positioning target elements 54) is connected to the carriage 43. In an embodiment, the mutual position between the positioning target element 54 and the headlight aiming device 40 is known beforehand.

In an embodiment, the operator interface 10 is positioned on the carriage 43.

In an embodiment, the vehicle calibration assistance structure 4 includes an optical projection system 6. The optical projection system 6 is connected to (supported by) the support structure 3. The optical projection system 6 includes a laser emitter 60. The laser emitter 60 is configured to project a ray onto a surface in proximity to the headlight testing instrument system 1 (for example, onto the vehicle 9).

In an embodiment, the system includes at least one safety calibration device connected to the support structure 3; in this case, there may be a first positioning target element 54 connected to the carriage 43 (or to the headlight aiming device 40), a second positioning target element 54 connected to the safety calibration device and (in one embodiment) a third positioning target element 54 connected to the support structure 3.

In an embodiment, the safety calibration device includes a reflector configured to reflect electromagnetic waves to facilitate alignment or calibration of a radar sensor of the vehicle's safety system.

In an embodiment, the safety calibration device includes a target panel 42 having a surface which faces the vehicle service area 8 and which bears an image providing a predetermined graphical feature to facilitate alignment or calibration of a camera or a LIDAR sensor of the vehicle 9.

In an embodiment, the target panel 42 is mounted (removably or displaceably) on the support structure 3 in addition to the carriage 43 which the headlight aiming device is (removably or displaceably) connected to.

The invention claimed is:

1. A headlight measurement system instrumentation structure for a vehicle, comprising:
   a support structure;
   a vehicle calibration assistance structure, which is mounted on the support structure and includes a headlight aiming device, configured to facilitate alignment or calibration of a headlight of the vehicle, the vehicle being positioned within a service area;
   a processing system configured to receive, from the headlight aiming device, data correlated with a light beam emitted by the headlight and to provide, through an interface, an informative indication relating to an operating condition of the headlight;

a communication port which is connectable to an electronic control unit of the vehicle,
wherein the processing system is further configured to:
retrieve, from the electronic control unit of the vehicle, input data including information relating to faults or informative indications regarding the state of the vehicle;
process the input data and generate drive signals;
send the drive signals to the electronic control unit of the vehicle to control the headlight of the vehicle through the electronic control unit of the vehicle,
wherein the headlight measurement system instrumentation structure further comprises:
a positioning target element, having a surface provided with a predetermined graphical feature, the positioning target element being supported by the support structure and oriented in a forward direction towards the service area;
a positioning device, configured for aiding a relative positioning between the vehicle, positioned in the service area, and the vehicle calibration assistance structure;
wherein the processing system is operatively coupled to the positioning device to receive data therefrom.

2. The headlight measurement system instrumentation structure of claim 1, wherein the drive signals include a command to switch on the headlight or a part of the headlight, thereby instructing the electronic control unit to switch on the headlight or the part of the headlight.

3. The headlight measurement system instrumentation structure of claim 2, wherein the drive signals include a command to make the headlight or part of it perform a reference movement by instructing the electronic control unit to vary the orientation of the headlight according to a predetermined path in order to check a correct operation of the headlight or the part of the headlight.

4. The headlight measurement system instrumentation structure of claim 1, wherein the information relating to the faults includes a plurality of fault codes and wherein the processing system includes a matching logic for associating each fault code of the plurality of fault codes with a corresponding fault item.

5. The headlight measurement system instrumentation structure of claim 1, wherein the processing system is configured to generate a report document containing at least the input data and to send the report document to a printer or to an external network.

6. The headlight measurement system instrumentation structure of claim 1, wherein the communication port includes a wireless device connectable to the control unit of the vehicle.

7. The headlight measurement system instrumentation structure of claim 1, wherein the communication port includes a vehicle communication interface, VCI, which is connectable to the control unit of the vehicle.

8. The headlight measurement system instrumentation structure of claim 1, wherein the electronic control unit of the vehicle includes a memory unit connected to the processing system to store the information relating to the faults or informative indications regarding the state of the vehicle, and wherein the drive signals include one or more delete commands to delete from the memory unit one or more of the information items relating to the faults or informative indications regarding the state of the vehicle.

9. The headlight measurement system instrumentation structure of claim 1, wherein the processing system is programmed with instructions to process the data received from the positioning device to determine measurements including at least a spatial relationship between the vehicle calibration assistance structure and the vehicle, wherein the positioning device is spaced from the support structure and includes an optical device, oriented in a lateral direction to view graphical features of the vehicle, and a matching camera, oriented in a backward direction to view the positioning target element.

10. The headlight measurement system instrumentation structure of claim 9, wherein the optical device includes a first camera and a second camera, arranged in stereo configuration, the processing system being configured to derive a 3D representation of a vehicle portion viewed by the first camera and the second camera.

11. The headlight measurement system instrumentation structure of claim 1, wherein the vehicle calibration assistance structure, which is mounted on the support structure, includes a safety calibration device, configured to facilitate alignment or calibration of a safety system component of the vehicle.

12. A method for checking a headlight of a vehicle, comprising the following steps:
capturing data correlated with a light beam emitted by the headlight of the vehicle positioned in a service area, this step being performed by a headlight aiming device;
processing the data correlated with the light beam emitted by the headlight of the vehicle, the step of processing being performed in a processing system;
sending to an interface an informative indication relating to an operating condition of the headlight;
connecting the processing system to an electronic control unit of the vehicle through a communication port;
receiving at the processing system input data retrieved by the electronic control unit of the vehicle, the input data including information relating to faults or informative indications regarding the state of the vehicle;
in the processing system, processing the input data and generating drive signals;
sending the drive signals to the electronic control unit of the vehicle to control the headlight of the vehicle through the electronic control unit of the vehicle,
positioning between the vehicle, located in the service area, and the vehicle calibration assistance structure by means of a positioning device and a positioning target element, including a surface provided with a predetermined graphical feature, the positioning target element being supported by the support structure and oriented in a forward direction towards the service area.

13. The method of claim 12, wherein the drive signals include a command to switch on the headlight or a part of it, thereby instructing the electronic control unit to switch on the headlight or the part of it.

14. The method of claim 12, comprising a step of generating a report document containing at least the input data and a step of sending the report document to a printer or to an external network.

15. A headlight measurement system instrumentation structure for a vehicle, comprising:
a support structure;
a vehicle calibration assistance structure, which is mounted on the support structure and includes a headlight aiming device, configured to facilitate alignment or calibration of a headlight of the vehicle, the vehicle being positioned within a service area;
a processing system configured to receive, from the headlight aiming device, data correlated with a light beam emitted by the headlight and to provide, through an interface, an informative indication relating to an operating condition of the headlight;

a communication port which is connectable to an electronic control unit of the vehicle, wherein the processing system is further configured to:

retrieve, from the electronic control unit of the vehicle, input data including information relating to faults or informative indications regarding the state of the vehicle;

process the input data and generate drive signals;

send the drive signals to the electronic control unit of the vehicle to control the headlight of the vehicle through the electronic control unit of the vehicle, wherein the electronic control unit of the vehicle includes a memory unit connected to the processing system to store the information relating to the faults or informative indications regarding the state of the vehicle, wherein the drive signals include one or more delete commands to delete from the memory unit one or more of the information items relating to the faults or informative indications regarding the state of the vehicle.

16. The headlight measurement system instrumentation structure of claim 15, wherein for each type of fault or informative indication, the drive signals comprise a respective delete command configured to delete the respective fault or informative indication from the memory unit.

17. The headlight measurement system instrumentation structure of claim 15, wherein the drive signals include a delete all command to delete from the memory unit all the information items relating to the faults or informative indications regarding the state of the vehicle.

* * * * *